Dec. 16, 1952     B. R. FIELD     2,622,233
CHARGING ARRANGEMENT OF ELECTRIC ACCUMULATORS
Filed Aug. 24, 1951     3 Sheets-Sheet 1

Inventor
B. R. Field

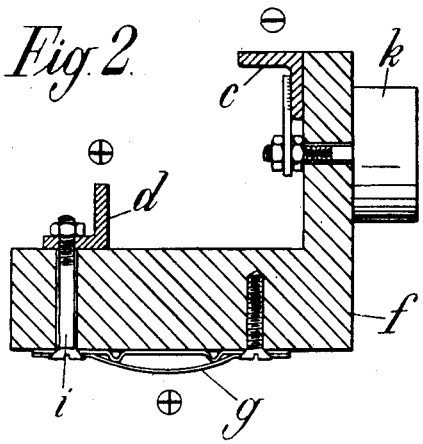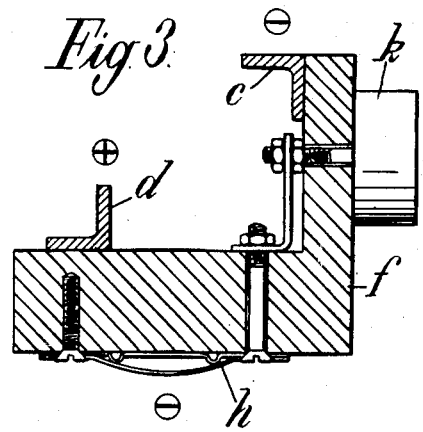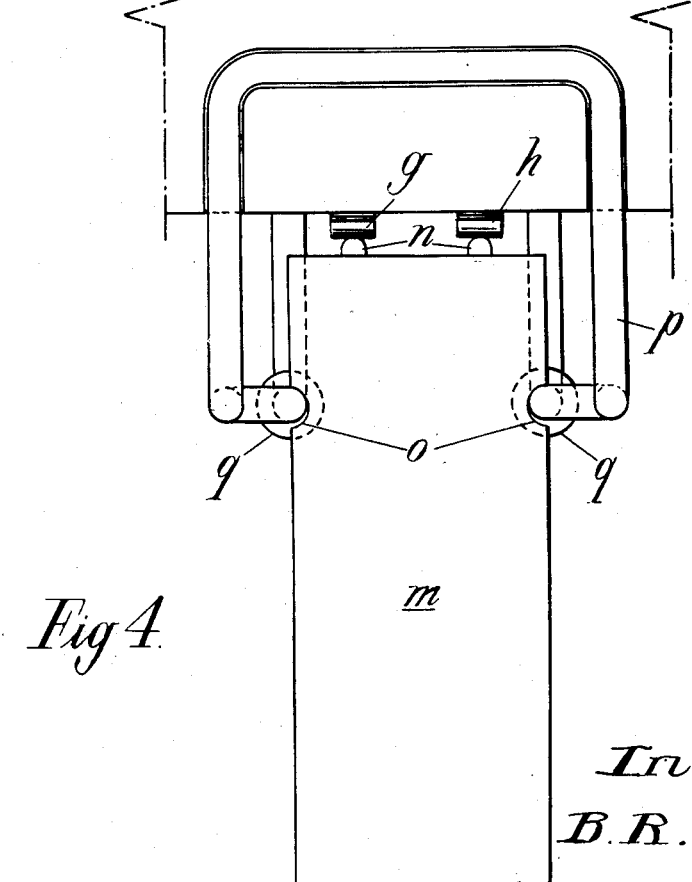

Patented Dec. 16, 1952

2,622,233

UNITED STATES PATENT OFFICE 2,622,233

CHARGING ARRANGEMENT OF ELECTRIC ACCUMULATORS

Braham Rowley Field, Redditch, England, assignor to Alkaline Batteries Limited, Redditch, England, a British company Application August 24, 1951, Serial No. 243,493
In Great Britain August 30, 1950

3 Claims. (Cl. 320—2)

This invention relates to charging gear as employed for the charging of electric storage batteries or accumulators such as used in portable units as for example miners' lamps.

Usually the batteries are placed in a rack and charged by orthodox cable or busbar methods.

The present invention has for its object to provide a simple construction of charging frame from which the usual copper conducting gear is eliminated. A further object is to provide in such frame convenient means for accurately locating the battery with relation to the charging contacts and for enabling unskilled workers to put the batteries into charging positions.

In accordance with my present invention, the charging frame comprises relatively heavy vertical members which form the main busbars across which the charging potential is applied and which are secured to and shrouded by insulating pillars, pairs of smaller or less heavy girder sections which run horizontally between the vertical members, one of each pair being electrically connected to one vertical member and the other to the other vertical member, shelves of insulating material secured to the horizontal girders, contacts connected to the horizontal girders, and means for suspending batteries from the shelves with their terminals in electrical connection with the contacts.

The shelves may be of right angle section and bolted to two horizontal girders which constitute busbars and carry the charging current to blade contact springs of suitable type secured on to the underside of the horizontal part of each shelf for engagement by the battery terminals.

The batteries to be charged have semi-cylindrical grooves formed in two opposite sides of their cases so arranged to engage with pairs of rails suspended from and below the shelves of insulating material before referred to. Each battery engages with one pair of rails. The rails may have collars thereon to limit the travel of the batteries when they are being brought to the charging position. There is a pair of charging contacts between the rails so that when a battery is slid into the charging position, the terminals on the battery make good electrical contact with the blade contact springs used as charging contacts. This arrangement ensures accurate location of the battery terminals and charging contacts without any special skill being required on the part of the person placing the batteries in the charging frame.

Two charging frames may be placed back to back with plates secured to the two main vertical busbars at the ends of the frames so as to produce a rigid self supporting structure.

By utilising the structural members of the charging frame as current carrying busbars I produce a simple and robust construction, without the usual copper conducting gear.

Referring to the accompanying explanatory drawings:

Figure 2 is a section on the line 2—2 in Figure 1.

Figure 3 is a section on the line 3—3 in Figure 1.

Figure 4 is a front elevation, and Figure 5 a side elevation of a convenient means for supporting a battery during charging.

Figure 1:
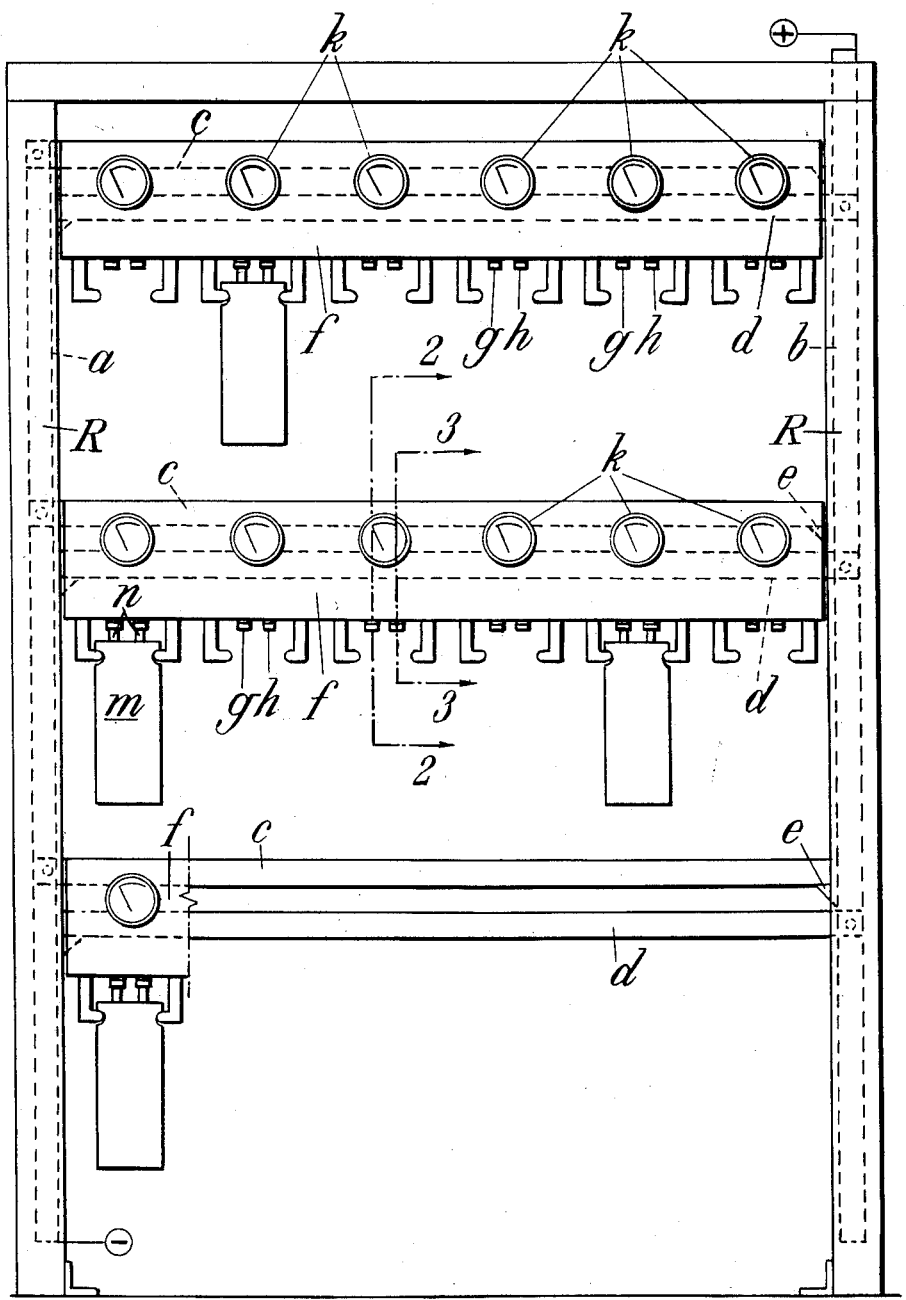
Figure 1 is a front view of a charging frame in accordance with the invention.

Referring to Figures 1–3, the charging frame has vertical steel members $a$ and $b$, which also form the main busbars, and horizontal steel girders $c$ and $d$ which are less heavy than the members $a$ and $b$. The girders $c$ are conductively connected, preferably by welding, to member $a$ and are insulated from member $b$. They are held in place at their ends by supports $e$ mounted on insulating pillars R. The girders $d$ are similarly connected to the member $b$ insulated from member $a$ and supported from the insulating pillars R. The charging potential is applied across the members $a$ and $b$.

Shelves $f$ of right angle section are bolted to the girders $c$ and $d$, and there are blade contact springs $g$ and $h$ secured to the underside of the shelves, each contact spring $g$ being conductively connected to the positive girder $d$ by a bolt $i$ and each spring $h$ being connected to the negative girder $c$ through an ammeter $k$ mounted on the vertical part of the shelf. The batteries $m$ which are being charged are suspended under the shelves with their terminals $n$ in contact with the contact springs $g$ and $h$.

Figure 5:
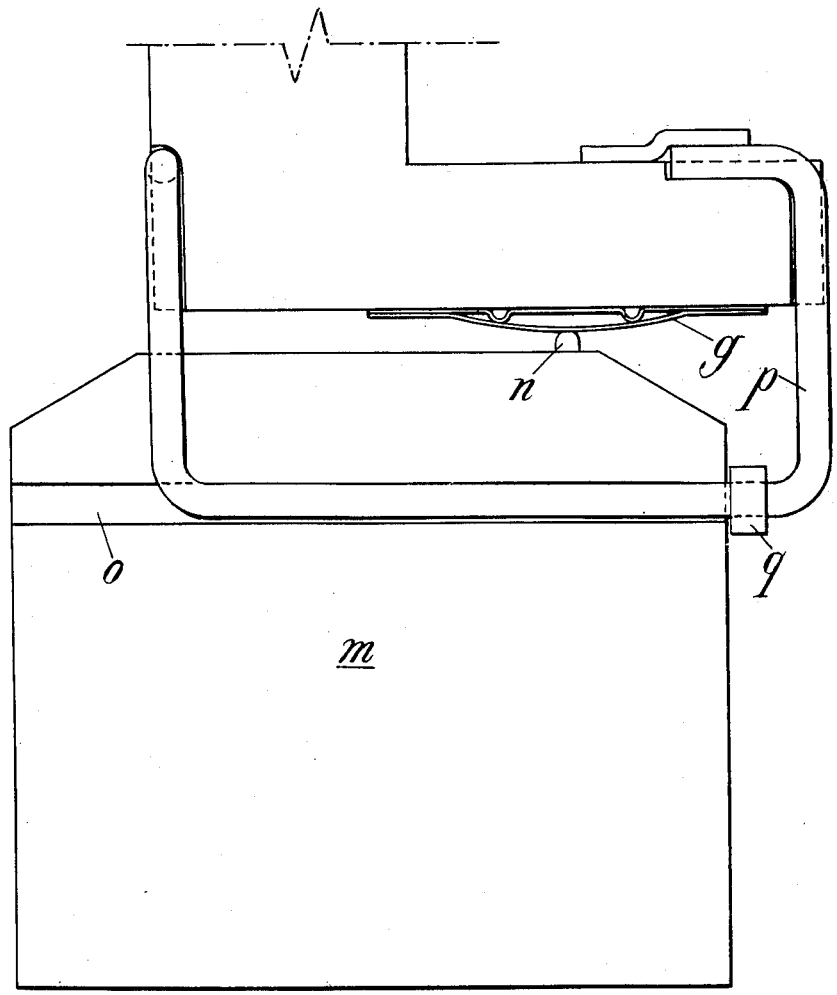

One convenient method of supporting the batteries is shown in Figures 4 and 5. The battery case has semi-cylindrical grooves $o$ in its two sides, and a rail unit $p$ made of metal rod is sprung into a groove in the vertical front face of the shelf and over the rear edge of the horizontal part of the shelf. The side parts of the rail unit $p$ extend below the shelf and are turned inwards so that the battery can be pushed in between them, with the rails in the grooves $o$ supporting the battery with its terminals $n$ in contact with the springs $g$ and $h$. There are collars $q$ on the rails to limit the movement of the battery.

What I claim is:

1. A charging frame for electric accumulators, which comprises relatively heavy vertical members which also form the main busbars across which the charging potential is applied, and which are suitably shrouded by insulating pillars, pairs of smaller or less heavy girder sections which run horizontally between the vertical members, one of each pair being electrically connected to one vertical member and the other to the other vertical member, shelves of insulating material secured to the horizontal girders, contacts connected to the horizontal girders, and means for suspending batteries from the shelves with their terminals in electrical connection with the contacts.

2. A charging frame as claimed in claim 1, in which the shelves are of right angle section and bolted to the two horizontal girders which constitute busbars and carry the charging current to blade contact springs of suitable type secured on to the underside of the horizontal part of each shelf for engagement by the battery terminals.

3. A charging frame as claimed in claim 2, in which rail units of metal rod are sprung into grooves in the vertical front faces of the shelves and over the rear edges of the horizontal parts of the shelves, with their side parts extending below the shelf and turned in to engage grooves in the sides of a battery pushed in between them.

BRAHAM ROWLEY FIELD.

REFERENCES CITED

The following references are of record in the file of this patent:

UNITED STATES PATENTS

| Number | Name | Date |
|---|---|---|
| 1,425,689 | Powell | Aug. 15, 1922 |
| 1,605,345 | Hawkins | Nov. 2, 1926 |
| 1,800,918 | Wheat | Apr. 14, 1931 |
| 1,981,210 | Wheat | Nov. 20, 1934 |
| 2,005,623 | Heyer | June 18, 1935 |
| 2,375,866 | Nelms et al. | May 15, 1945 |